(12) United States Patent
Fu et al.

(10) Patent No.: US 11,358,125 B2
(45) Date of Patent: Jun. 14, 2022

(54) BISMUTH OXIDE/BISMUTH SUBCARBONATE/BISMUTH MOLYBDATE COMPOSITE PHOTOCATALYST AND PREPARATION METHOD THEREOF

(71) Applicant: YAN'AN UNIVERSITY, Shaanxi (CN)

(72) Inventors: Feng Fu, Shaanxi (CN); Huidong Shen, Shaanxi (CN); Danjun Wang, Shaanxi (CN); Yanzhong Zhen, Shaanxi (CN); Wenwen Xue, Shaanxi (CN); Long Yan, Shaanxi (CN)

(73) Assignee: YAN'AN UNIVERSITY, Yan'an Shaanxi (CN)

( * ) Notice: Subject to any disclaimer, the term of this patent is extended or adjusted under 35 U.S.C. 154(b) by 107 days.

(21) Appl. No.: 16/910,553

(22) Filed: Jun. 24, 2020

(65) Prior Publication Data

US 2020/0406233 A1   Dec. 31, 2020

(30) Foreign Application Priority Data

Jun. 25, 2019 (CN) .......................... 201910555108.X (51) Int. Cl.
*B01J 23/31* (2006.01)
*B01J 23/18* (2006.01)
(Continued)

(52) U.S. Cl.
CPC .............. *B01J 23/31* (2013.01); *B01J 23/18* (2013.01); *B01J 27/232* (2013.01); *B01J 35/004* (2013.01);
(Continued)

(58) Field of Classification Search
CPC . B01J 23/31; B01J 23/18; B01J 27/232; B01J 35/0013; B01J 35/004; B01J 37/009;
(Continued)

(56) References Cited

FOREIGN PATENT DOCUMENTS

| CN | 102942219 | * | 2/2013 | ............. B82Y 40/00 |
| CN | 104923211 | * | 9/2015 | ............... A62D 3/17 |

(Continued)

OTHER PUBLICATIONS

Junlei Zhang et al., "Facile Formation of Bi2O2CO3/Bi2MoO6 Nanosheets for Visible Light-Driven Photocatalysis." ACS Omega, 4, pp. 3871-3880. (Year: 2019).*

(Continued)

*Primary Examiner* — Patricia L. Hailey
(74) *Attorney, Agent, or Firm* — Ohlandt, Greeley, Ruggiero & Perle, L.L.P.

(57) ABSTRACT

The present invention discloses a bismuth oxide ($Bi_2O_3$)/bismuth subcarbonate (($BiO)_2CO_3$)/bismuth molybdate ($Bi_2MoO_6$) composite photocatalyst, including a $Bi_2MoO_6$ photocatalyst, where $Bi_2O_3$ and $(BiO)_2CO_3$ nanosheets are introduced to a surface of the $Bi_2MoO_6$ through addition of $Na_2CO_3$ and roasting. The present invention also discloses a preparation method of the $Bi_2O_3/(BiO)_2CO_3/Bi_2MoO_6$ composite photocatalyst which is specifically implemented by the following steps: step 1: preparing a $Bi_2MoO_6$ photocatalyst; step 2: introducing $Bi_2O_3$ and $(BiO)_2CO_3$ nanosheets to a surface of the $Bi_2MoO_6$ photocatalyst obtained in step 1 through addition of $Na_2CO_3$ and roasting to obtain the $Bi_2O_3/(BiO)_2CO_3/Bi_2MoO_6$ composite photocatalyst. The photocatalyst of the present invention has no agglomeration, a wide responsive range of visible light, a significantly improved catalytic activity compared with a $Bi_2MoO_6$ alone, and excellent reusability. Moreover, the preparation method is simple with mild conditions, desired controllability and convenient operation.

9 Claims, 4 Drawing Sheets

(51) Int. Cl.
  *B01J 27/232* (2006.01)
  *B01J 35/00* (2006.01)
  *B01J 37/00* (2006.01)
  *B01J 37/02* (2006.01)
  *B01J 37/04* (2006.01)
  *B01J 37/06* (2006.01)
  *B01J 37/10* (2006.01)
  *B01J 37/34* (2006.01)
  *C02F 1/30* (2006.01)
  *C02F 1/72* (2006.01)
  *C02F 101/34* (2006.01)

(52) U.S. Cl.
  CPC ......... *B01J 35/0013* (2013.01); *B01J 37/009* (2013.01); *B01J 37/0221* (2013.01); *B01J 37/0236* (2013.01); *B01J 37/04* (2013.01); *B01J 37/06* (2013.01); *B01J 37/10* (2013.01); *B01J 37/343* (2013.01); *C02F 1/30* (2013.01); *C02F 1/725* (2013.01); *C02F 2101/345* (2013.01); *C02F 2305/10* (2013.01)

(58) Field of Classification Search
  CPC .... B01J 37/0221; B01J 37/0236; B01J 37/04; B01J 37/06; B01J 37/10; B01J 37/343; C02F 1/30; C02F 1/725; C02F 2101/345; C02F 2305/10
  USPC .............................................. 502/5, 311, 353
  See application file for complete search history.

(56) References Cited

FOREIGN PATENT DOCUMENTS

| CN | 107115857 | * | 9/2017 | .............. B01J 23/18 |
|---|---|---|---|---|
| CN | 108273492 | * | 7/2018 | .............. B01J 23/18 |
| CN | 108722458 | * | 11/2018 | ............ B01J 27/232 |
| CN | 108745393 | * | 11/2018 | ............ B01J 27/232 |
| CN | 109939673 | * | 6/2019 | .............. B01J 23/31 |
| CN | 111822028 | * | 10/2020 | ............ B01D 67/00 |

OTHER PUBLICATIONS

Yang-Sen Xu et al., "Wide Bandgap $Bi_2O_2CO_3$-Coupled $Bi_2MoO_6$ Heterostructured Hollow Microspheres: One-Pot Synthesis and Enhanced Visible-Light Photocatalytic Activity." Journal of Nanoscience and Nanotechnology, vol. 14, pp. 6800-6808. (Year: 2014).*

Junlei Zhang et al., "Ag—$Ag_2CO_3$/$Bi_2MoO_6$ composites with enhanced visible-light-driven catalytic activity." Journal of the Taiwan Institute of Chemical Engineers 88, pp. 121-129. (Year: 2018).*

* cited by examiner

BISMUTH OXIDE/BISMUTH SUBCARBONATE/BISMUTH MOLYBDATE COMPOSITE PHOTOCATALYST AND PREPARATION METHOD THEREOF

TECHNICAL FIELD

The present invention belongs to the technical field of preparation of industrial catalysts, and in particular relates to a bismuth oxide ($Bi_2O_3$)/bismuth subcarbonate (($BiO)_2CO_3$)/bismuth molybdate ($Bi_2MoO_6$) composite photocatalyst and a preparation method thereof.

BACKGROUND $Bi_2MoO_6$ is an Aurivillius compound having the simplest structure, and specifically a layered composite oxide formed by a $(Bi_2O_2)^2$ layer and a $(MoO_4)^{2+}$ layer which are alternately stacked. $Bi_2MoO_6$ has a valence band formed by hybridization of $Bi_{6s}$ and $O_{2p}$ orbitals and a conduction band formed by $Mo_{3d}$ orbitals, with a band gap of about 2.5-2.8 eV and a maximum absorption wavelength of about 490 nm. It can be excited through absorption of part of visible light. Therefore, research and development of the photocatalyst of $Bi_2MoO_6$ provides a new idea for improving a utilization rate of sunlight. The photocatalyst of $Bi_2MoO_6$ has potential applications in the fields of environmental purification and new energy development, and has become one of the widely studied photocatalysts currently. However, $Bi_2MoO_6$ still has defects of a relatively narrow responsive range of visible light, easy recombination of photogenerated electron-hole pairs, short lifetime and slow migration rate, which greatly limits the practical application of the photocatalyst of $Bi_2MoO_6$. In view of the defects or deficiencies of the photocatalyst of $Bi_2MoO_6$, modification is employed to develop a new material with high photocatalytic activity under visible light and stable performance which are key factors for practical application.

SUMMARY

A first objective of the present invention is to provide a $Bi_2O_3$/($BiO)_2CO_3$/$Bi_2MoO_6$ composite photocatalyst which has desired visible light response and can promote separation of the photogenerated electron-hole pairs, thereby solving the problem that the $Bi_2MoO_6$ has low photocatalytic activity under visible light.

A second objective of the present invention is to provide a preparation method of the above $Bi_2O_3$/($BiO)_2CO_3$/$Bi_2MoO_6$ composite photocatalyst.

In order to achieve the first objective above, a technical solution of the present invention provides a $Bi_2O_3$/($BiO)_2CO_3$/$Bi_2MoO_6$ composite photocatalyst, including $Bi_2MoO_6$, where $Bi_2O_3$ and ($BiO)_2CO_3$ nanosheets are introduced to a surface of the $Bi_2MoO_6$ through addition of $Na_2CO_3$ and roasting.

In order to achieve the second objective above, a second technical solution of the present invention provides a preparation method of a $Bi_2O_3$/($BiO)_2CO_3$/$Bi_2MoO_6$ composite photocatalyst, which is specifically implemented by the following steps:

Step 1: preparing a $Bi_2MoO_6$ photocatalyst;

Step 2: introducing $Bi_2O_3$ and ($BiO)_2CO_3$ nanosheets to a surface of the $Bi_2MoO_6$ photocatalyst obtained in step 1 through addition of $Na_2CO_3$ and roasting to obtain the $Bi_2O_3$/($BiO)_2CO_3$/$Bi_2MoO_6$ composite photocatalyst.

The second technical solution of the present invention also has the following features:

The step 1 specifically includes:

Step 1.1: taking $Bi(NO_3)_3 \cdot 5H_2O$ and $Na_2MoO_4 \cdot 2H_2O$ in a molar ratio of 2:1, dissolving the $Bi(NO_3)_3 \cdot 5H_2O$ in an ethylene glycol solution, then adding the $Na_2MoO_4 \cdot 2H_2O$ to the ethylene glycol solution, and finally stirring until a clear solution is obtained;

Step 1.2: adding anhydrous ethanol to the clear solution obtained in step 1.1, stirring well, transferring to a reaction kettle for sealing, placing the reaction kettle into an electric heating thermostatic blast drying oven for reaction to obtain a mixed solution A, naturally cooling the mixed solution A to room temperature after the reaction is completed, and then separating by centrifuging, washing and vacuum drying to obtain a $Bi_2MoO_6$ photocatalyst.

In the step 1.2, the reaction in the electric heating thermostatic blast drying oven is carried out at 160° C. for 12 h.

In the step 1.2, the vacuum drying is carried out at 60° C. for 5 h.

In the step 1.2, the reaction kettle is a stainless steel reaction kettle lined with Teflon.

The step 2 specifically includes:

Step 2.1: turning the $Bi_2MoO_6$ photocatalyst obtained in step 1 into a powder, then dispersing in deionized water and subjecting to ultrasonic treatment to obtain a mixed solution B;

Step 2.2: adding a $Na_2CO_3$ solution dropwise to the mixed solution B obtained in step 2.1 to obtain a mixed solution C, where a molar ratio of the $Na_2CO_3$ to the $Bi_2MoO_6$ photocatalyst is not greater than 0.3:1;

Step 2.3: performing thermostatic vacuum drying of the mixed solution C obtained in step 2.2 until water is evaporated to dry, roasting the mixed solution C after completion of the thermostatic vacuum drying, washing with distilled water for several times to remove residual $Na_2CO_3$ solution, and vacuum drying at 60° C. for 5 h to obtain the $Bi_2O_3$/($BiO)_2CO_3$/$Bi_2MoO_6$ composite photocatalyst.

In the step 2.3, the thermostatic vacuum drying is carried at 50-70° C. for 6-8 h.

In the step 2.3, the roasting is carried out at 200-400° C. for 1-3 h.

The beneficial effects of the present invention are as follows: the $Bi_2O_3$/($BiO)_2CO_3$/$Bi_2MoO_6$ composite photocatalyst obtained by the preparation method of the present invention has no agglomeration, a wide responsive range of visible light, a significantly improved catalytic activity compared with a $Bi_2MoO_6$ alone, and excellent reusability. Moreover, the preparation method of the present invention is simple with mild conditions, desired controllability and convenient operation.

BRIEF DESCRIPTION OF DRAWINGS

In the figures, BMO represents the $Bi_2MoO_6$ photocatalyst obtained in Comparative Example 1, BMO-NO represents the roasted $Bi_2MoO_6$ photocatalyst obtained in Comparative Example 2, Etched BMO-2 represents the $Bi_2MoO_6$ photocatalyst obtained in Comparative Example 3, BMO-1 represents the $Bi_2O_3/(BiO)_2CO_3/Bi_2MoO_6$ composite photocatalyst obtained in Example 1, BMO-2 represents the $Bi_2O_3/(BiO)_2CO_3/Bi_2MoO_6$ composite photocatalyst obtained in Example 2, BMO-3 represents $Bi_2O_3/(BiO)_2CO_3/Bi_2MoO_6$ composite photocatalyst obtained in Example 3, and BMO-4 represents the $Bi_2O_3/(BiO)_2CO_3/Bi_2MoO_6$ composite photocatalyst obtained in Example 4.

DETAILED DESCRIPTION

The present invention will be further described in detail with reference to the accompanying drawings and specific examples.

The present invention provides a $Bi_2O_3/(BiO)_2CO_3/Bi_2MoO_6$ composite photocatalyst, including $Bi_2MoO_6$, where $Bi_2O_3$ and $(BiO)_2CO_3$ nanosheets are introduced to a surface of the $Bi_2MoO_6$ through addition of $Na_2CO_3$ and roasting.

The present invention provides a preparation method of the $Bi_2O_3/(BiO)_2CO_3/Bi_2MoO_6$ composite photocatalyst, which is specifically implemented by the following steps:

Step 1.1: taking $Bi(NO_3)_3 \cdot 5H_2O$ and $Na_2MoO_4 \cdot 2H_2O$ in a molar ratio of 2:1, dissolving the $Bi(NO_3)_3 \cdot 5H_2O$ in an ethylene glycol solution, then adding the $Na_2MoO_4 \cdot 2H_2O$ to the ethylene glycol solution, and finally stirring until a clear solution is obtained;

Step 1.2: adding anhydrous ethanol to the clear solution obtained in step 1.1, stirring well, transferring to a stainless steel reaction kettle lined with Teflon for sealing, placing the reaction kettle into an electric heating thermostatic blast drying oven, reacting at 160° C. for 12 h to obtain a mixed solution A, naturally cooling the mixed solution A to room temperature after the reaction is completed, and then separating by centrifuging, washing and vacuum drying at 60° C. for 5 h to obtain a $Bi_2MoO_6$ photocatalyst;

Step 2.1: turning the $Bi_2MoO_6$ photocatalyst obtained in step 1.2 into a powder, then dispersing it in deionized water and subjecting to ultrasonic treatment to obtain a mixed solution B;

Step 2.2: adding a $Na_2CO_3$ solution dropwise to the mixed solution B obtained in step 2.1 to obtain a mixed solution C, where a molar ratio of the $Na_2CO_3$ to the $Bi_2MoO_6$ photocatalyst is not greater than 0.3:1;

Step 2.3: performing thermostatic vacuum drying of the mixed solution C obtained in step 2.2 at 50-70° C. for 6-8 h until water is evaporated to dry, roasting the mixed solution C at 200-400° C. for 1-3 h after completion of the thermostatic vacuum drying, washing with distilled water for several times to remove residual $Na_2CO_3$ solution, and vacuum drying at 60° C. for 5 h to obtain the $Bi_2O_3/(BiO)_2CO_3/Bi_2MoO_6$ composite photocatalyst.

Example 1

A preparation method of the $Bi_2O_3/(BiO)_2CO_3/Bi_2MoO_6$ composite photocatalyst of the present invention was specifically implemented by the following steps:

Step 1.1: $Bi(NO_3)_3 \cdot 5H_2O$ and $Na_2MoO_4 \cdot 2H_2O$ in a molar ratio of 2:1 was taken. The $Bi(NO_3)_3 \cdot 5H_2O$ was dissolved in an ethylene glycol solution. Then the $Na_2MoO_4 \cdot 2H_2O$ was added to the ethylene glycol solution, and finally stirred until a clear solution was obtained.

Step 1.2: anhydrous ethanol was added to the clear solution obtained in step 1.1, stirring well, transferred to a stainless steel reaction kettle lined with Teflon and sealed. The reaction kettle was placed into an electric heating thermostatic blast drying oven. Reaction was carried out at 160° C. for 12 h to obtain a mixed solution A. The mixed solution A was naturally cooled to room temperature after the reaction was completed, and then subjected to separating by centrifuging, washing and vacuum drying at 60° C. for 5 h to obtain a $Bi_2MoO_6$ photocatalyst.

Step 2.1: the $Bi_2MoO_6$ photocatalyst obtained in step 1.2 was turned into a powder, then dispersed in deionized water and subjected to ultrasonic treatment to obtain a mixed solution B.

Step 2.2: a $Na_2CO_3$ solution was added dropwise to the mixed solution B obtained in step 2.1 to obtain a mixed solution C, where a molar ratio of the $Na_2CO_3$ to the $Bi_2MoO_6$ photocatalyst was 0.086:1.

Step 2.3: thermostatic vacuum drying of the mixed solution C obtained in step 2.2 was performed at 50° C. for 6 h until water was evaporated to dry. The mixed solution C was roasted at 200° C. for 1 h after completion of the thermostatic vacuum drying, washed with distilled water for several times to remove residual $Na_2CO_3$ solution, and vacuum dried at 60° C. for 5 h to obtain the $Bi_2O_3/(BiO)_2CO_3/Bi_2MoO_6$ composite photocatalyst.

Example 2

A preparation method of the $Bi_2O_3/(BiO)_2CO_3/Bi_2MoO_6$ composite photocatalyst of the present invention was specifically implemented by the following steps:

Step 1.1: $Bi(NO_3)_3 \cdot 5H_2O$ and $Na_2MoO_4 \cdot 2H_2O$ in a molar ratio of 2:1 was taken. The $Bi(NO_3)_3 \cdot 5H_2O$ was dissolved in an ethylene glycol solution. Then the $Na_2MoO_4 \cdot 2H_2O$ was added to the ethylene glycol solution, and finally stirred until a clear solution was obtained.

Step 1.2: anhydrous ethanol was added to the clear solution obtained in step 1.1, stirring well, transferred to a stainless steel reaction kettle lined with Teflon and sealed. The reaction kettle was placed into an electric heating thermostatic blast drying oven. Reaction was carried out at 160° C. for 12 h to obtain a mixed solution A. The mixed solution A was naturally cooled to room temperature after the reaction was completed, and then subjected to separating by centrifuging, washing and vacuum drying at 60° C. for 5 h to obtain a $Bi_2MoO_6$ photocatalyst.

Step 2.1: the $Bi_2MoO_6$ photocatalyst obtained in step 1.2 was turned into a powder, then dispersed in deionized water and subjected to ultrasonic treatment to obtain a mixed solution B.

Step 2.2: a $Na_2CO_3$ solution was added dropwise to the mixed solution B obtained in step 2.1 to obtain a mixed solution C, where a molar ratio of the $Na_2CO_3$ to the $Bi_2MoO_6$ photocatalyst was 0.115:1.

Step 2.3: thermostatic vacuum drying of the mixed solution C obtained in step 2.2 was performed at 60° C. for 7 h until water was evaporated to dry. The mixed solution C was roasted at 250° C. for 2 h after completion of the thermostatic vacuum drying, washed with distilled water for several times to remove residual $Na_2CO_3$ solution, and vacuum dried at 60° C. for 5 h to obtain the $Bi_2O_3/(BiO)_2CO_3/Bi_2MoO_6$ composite photocatalyst.

Example 3

A preparation method of the $Bi_2O_3/(BiO)_2CO_3/Bi_2MoO_6$ composite photocatalyst of the present invention was specifically implemented by the following steps:

Step 1.1: $Bi(NO_3)_3.5H_2O$ and $Na_2MoO_4.2H_2O$ in a molar ratio of 2:1 was taken. The $Bi(NO_3)_3.5H_2O$ was dissolved in an ethylene glycol solution. Then the $Na_2MoO_4.2H_2O$ was added to the ethylene glycol solution, and finally stirred until a clear solution was obtained.

Step 1.2: anhydrous ethanol was added to the clear solution obtained in step 1.1, stirring well, transferred to a stainless steel reaction kettle lined with Teflon and sealed. The reaction kettle was placed into an electric heating thermostatic blast drying oven. Reaction was carried out at 160° C. for 12 h to obtain a mixed solution A. The mixed solution A was naturally cooled to room temperature after the reaction was completed, and then subjected to separating by centrifuging, washing and vacuum drying at 60° C. for 5 h to obtain a $Bi_2MoO_6$ photocatalyst.

Step 2.1: the $Bi_2MoO_6$ photocatalyst obtained in step 1.2 was turned into a powder, then dispersed in deionized water and subjected to ultrasonic treatment to obtain a mixed solution B.

Step 2.2: a $Na_2CO_3$ solution was added dropwise to the mixed solution B obtained in step 2.1 to obtain a mixed solution C, where a molar ratio of the $Na_2CO_3$ to the $Bi_2MoO_6$ photocatalyst was 0.144:1.

Step 2.3: thermostatic vacuum drying of the mixed solution C obtained in step 2.2 was performed at 65° C. for 7 h until water was evaporated to dry. The mixed solution C was roasted at 300° C. for 3 h after completion of the thermostatic vacuum drying, washed with distilled water for several times to remove residual $Na_2CO_3$ solution, and vacuum dried at 60° C. for 5 h to obtain the $Bi_2O_3/(BiO)_2CO_3/Bi_2MoO_6$ composite photocatalyst.

Example 4

A preparation method of the $Bi_2O_3/(BiO)_2CO_3/Bi_2MoO_6$ composite photocatalyst of the present invention was specifically implemented by the following steps:

Step 1.1: $Bi(NO_3)_3.5H_2O$ and $Na_2MoO_4.2H_2O$ in a molar ratio of 2:1 was taken. The $Bi(NO_3)_3.5H_2O$ was dissolved in an ethylene glycol solution. Then the $Na_2MoO_4.2H_2O$ was added to the ethylene glycol solution, and finally stirred until a clear solution was obtained.

Step 1.2: anhydrous ethanol was added to the clear solution obtained in step 1.1, stirring well, transferred to a stainless steel reaction kettle lined with Teflon and sealed. The reaction kettle was placed into an electric heating thermostatic blast drying oven. Reaction was carried out at 160° C. for 12 h to obtain a mixed solution A. The mixed solution A was naturally cooled to room temperature after the reaction was completed, and then subjected to separating by centrifuging, washing and vacuum drying at 60° C. for 5 h to obtain a $Bi_2MoO_6$ photocatalyst.

Step 2.1: the $Bi_2MoO_6$ photocatalyst obtained in step 1.2 was turned into a powder, then dispersed in deionized water and subjected to ultrasonic treatment to obtain a mixed solution B.

Step 2.2: a $Na_2CO_3$ solution was added dropwise to the mixed solution B obtained in step 2.1 to obtain a mixed solution C, where a molar ratio of the $Na_2CO_3$ to the $Bi_2MoO_6$ photocatalyst was 0.230:1.

Step 2.3: thermostatic vacuum drying of the mixed solution C obtained in step 2.2 was performed at 70° C. for 8 h until water was evaporated to dry. The mixed solution C was roasted at 400° C. for 3 h after completion of the thermostatic vacuum drying, washed with distilled water for several times to remove residual $Na_2CO_3$ solution, and vacuum dried at 60° C. for 5 h to obtain the $Bi_2O_3/(BiO)_2CO_3/Bi_2MoO_6$ composite photocatalyst.

Comparative Example 1

For comparison with the preparation method of the $Bi_2O_3/(BiO)_2CO_3/Bi_2MoO_6$ composite photocatalyst of the present invention in Example 2, a preparation method was specifically implemented by the following steps:

Step 1.1: $Bi(NO_3)_3.5H_2O$ and $Na_2MoO_4.2H_2O$ in a molar ratio of 2:1 was taken. The $Bi(NO_3)_3.5H_2O$ was dissolved in an ethylene glycol solution. Then the $Na_2MoO_4.2H_2O$ was added to the ethylene glycol solution, and finally stirred until a clear solution was obtained.

Step 1.2: anhydrous ethanol was added to the clear solution obtained in step 1.1, stirring well, transferred to a stainless steel reaction kettle lined with Teflon and sealed. The reaction kettle was placed into an electric heating thermostatic blast drying oven. Reaction was carried out at 160° C. for 12 h to obtain a mixed solution A. The mixed solution A was naturally cooled to room temperature after the reaction was completed, and then subjected to separating by centrifuging, washing and vacuum drying at 60° C. for 5 h to obtain a $Bi_2MoO_6$ photocatalyst.

Comparative Example 2

For comparison with the preparation method of the $Bi_2O_3/(BiO)_2CO_3/Bi_2MoO_6$ composite photocatalyst of the present invention in Example 2, a preparation method was specifically implemented by the following steps:

Step 1.1: $Bi(NO_3)_3.5H_2O$ and $Na_2MoO_4.2H_2O$ in a molar ratio of 2:1 was taken. The $Bi(NO_3)_3.5H_2O$ was dissolved in an ethylene glycol solution. Then the $Na_2MoO_4.2H_2O$ was added to the ethylene glycol solution, and finally stirred until a clear solution was obtained.

Step 1.2: anhydrous ethanol was added to the clear solution obtained in step 1.1, stirring well, transferred to a stainless steel reaction kettle lined with Teflon and sealed. The reaction kettle was placed into an electric heating thermostatic blast drying oven. Reaction was carried out at 160° C. for 12 h to obtain a mixed solution A. The mixed solution A was naturally cooled to room temperature after the reaction was completed, and then subjected to separating by centrifuging, washing and vacuum drying at 60° C. for 5 h to obtain a $Bi_2MoO_6$ photocatalyst.

Step 2.1: the $Bi_2MoO_6$ photocatalyst obtained in step 1.2 was turned into a powder, then dispersed in deionized water and subjected to ultrasonic treatment to obtain a mixed solution B.

Step 2.3: thermostatic vacuum drying of the mixed solution B obtained in step 2.1 was performed at 60° C. for 7 h until water was evaporated to dry. The mixed solution C was roasted at 250° C. for 2 h after completion of the thermostatic vacuum drying to obtain a $Bi_2MoO_6$ photocatalyst.

Comparative Example 3

For comparison with the preparation method of the $Bi_2O_3/(BiO)_2CO_3/Bi_2MoO_6$ composite photocatalyst of the present invention in Example 2, a preparation method was specifically implemented by the following steps:

Step 1.1: $Bi(NO_3)_3 \cdot 5H_2O$ and $Na_2MoO_4 \cdot 2H_2O$ in a molar ratio of 2:1 was taken. The $Bi(NO_3)_3 \cdot 5H_2O$ was dissolved in an ethylene glycol solution. Then the $Na_2MoO_4 \cdot 2H_2O$ was added to the ethylene glycol solution, and finally stirred until a clear solution was obtained.

Step 1.2: anhydrous ethanol was added to the clear solution obtained in step 1.1, stirring well, transferred to a stainless steel reaction kettle lined with Teflon and sealed. The reaction kettle was placed into an electric heating thermostatic blast drying oven. Reaction was carried out at 160° C. for 12 h to obtain a mixed solution A. The mixed solution A was naturally cooled to room temperature after the reaction was completed, and then subjected to separating by centrifuging, washing and vacuum drying at 60° C. for 5 h to obtain a $Bi_2MoO_6$ photocatalyst.

Step 2.1: the $Bi_2MoO_6$ photocatalyst obtained in step 1.2 was turned into a powder, then dispersed in deionized water and subjected to ultrasonic treatment to obtain a mixed solution B.

Step 2.2: a $Na_2CO_3$ solution was added dropwise to the mixed solution B obtained in step 2.1 to obtain a mixed solution C, where a molar ratio of the $Na_2CO_3$ to the $Bi_2MoO_6$ photocatalyst was 0.115:1.

Step 2.3: thermostatic vacuum drying of the mixed solution C obtained in step 2.2 was performed at 60° C. for 7 h until water was evaporated to dry. After completion of the thermostatic vacuum drying, washing was carried out with distilled water for several times to remove residual $Na_2CO_3$ solution. Vacuum drying was carried out at 60° C. for 5 h to obtain an etched $Bi_2MoO_6$ photocatalyst.

Figure 1:
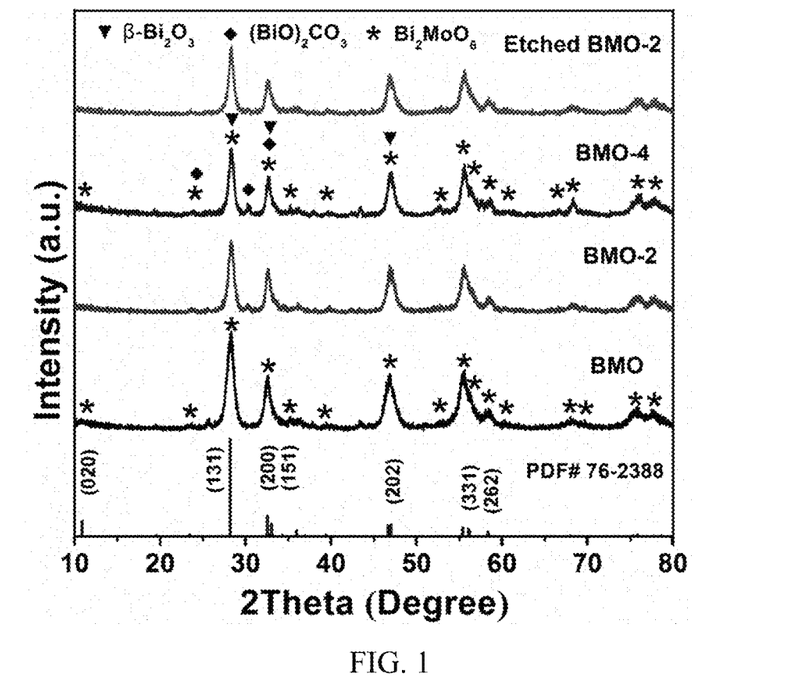
FIG. 1 shows X-ray powder diffraction (XRPD) patterns of a $Bi_2MoO_6$ photocatalyst and the $Bi_2O_3$/($BiO)_2CO_3$/$Bi_2MoO_6$ composite photocatalyst obtained by the preparation method of the present invention.

FIG. 1 showed XRPD patterns of BMO and BMO-2. It can be seen from FIG. 1 that the X-ray diffraction (XRD) characteristic peaks of BMO-2 were almost the same as those of BMO, indicating that roasting at a low temperature did not affect the crystal structure of BMO. In addition, a series of new characteristic peaks were seen, indicating the presence of $(BO)_2CO_3$ and $Bi_2O_3$.

Figure 2:
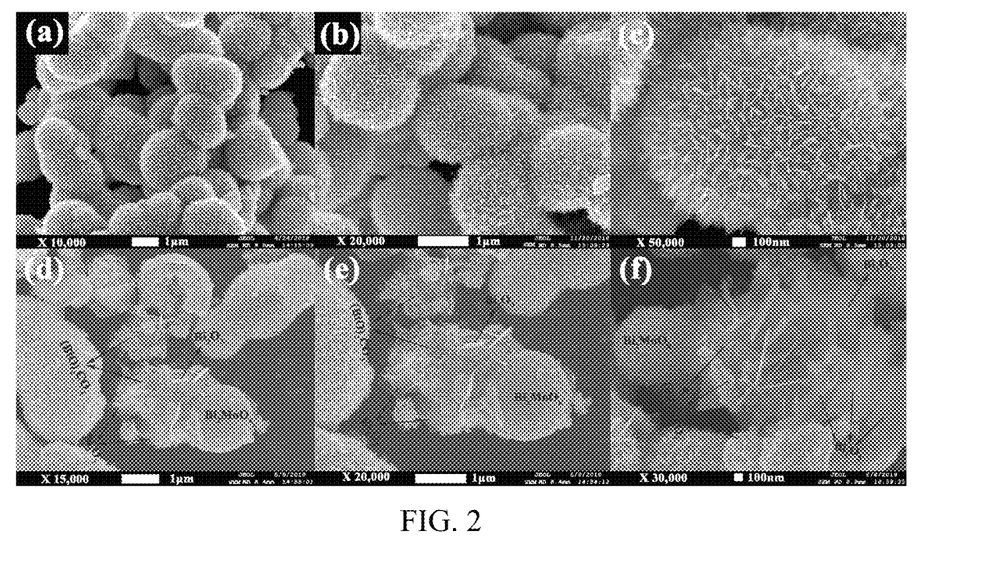
FIG. 2 shows scanning electron microscope (SEM) images of a $Bi_2MoO_6$ photocatalyst and the $Bi_2O_3$/($BiO)_2CO_3$/$Bi_2MoO_6$ composite photocatalyst obtained by the preparation method of the present invention.

FIG. 2 showed SEM images of BMO and BMO-2, where (a), (b) and (c) referred to BMO in which (b) and (c) were enlarged views of (a); and (d), (e) and (f) referred to BMO-2 in which (e) and (f) were enlarged views of (d). As can be seen from (a), (b) and (c) in FIG. 2, BMO had a three-dimensional (3D) spherical and hierarchical structure assembled from a large number of nanosheets, with an average diameter of 1-2 μm, and the nanosheets had a thickness of about 10-20 nm ((c)). As can be seen from (d), (e) and (f) in FIG. 2, the morphology and size of BMO-2 were basically the same as those of BMO, while the (BiO)$_2$CO$_3$ and the $Bi_2O_3$ ultra-thin nanosheets were seen on the surface of BMO ((e) and (f)).

Figure 3:
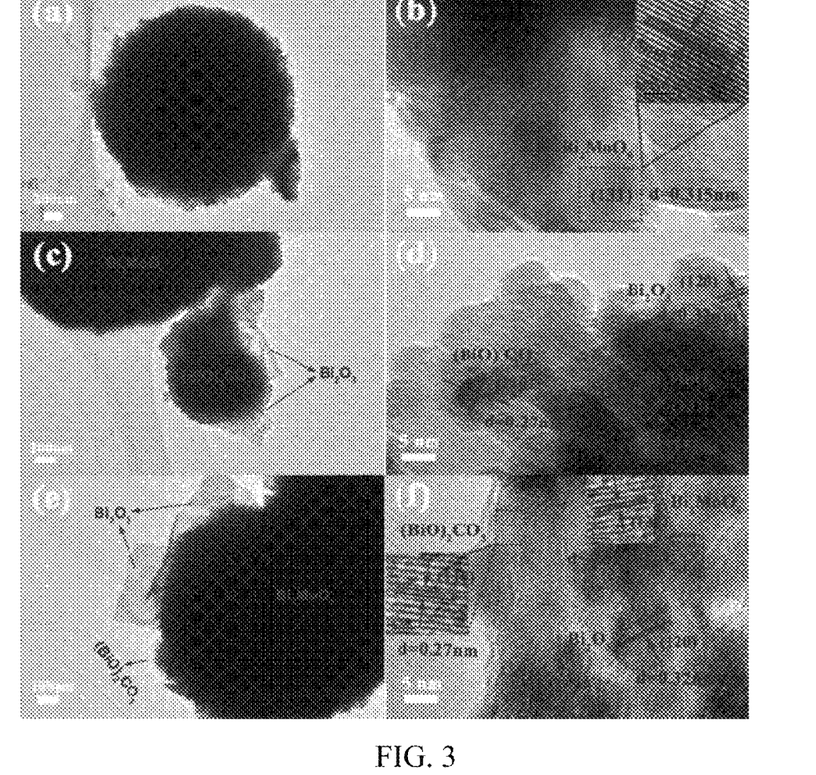
FIG. 3 shows SEM images of a $Bi_2MoO_6$ photocatalyst and the $Bi_2O_3$/($BiO)_2CO_3$/$Bi_2MoO_6$ composite photocatalyst obtained by the preparation method of the present invention.

In FIG. 3, (a) represented the TEM image of BMO; (b) represented the high resolution (HR)-TEM image of BMO; (c) and (e) represented the TEM images of BMO-2; (d) and (f) represented the HR-TEM images of BMO-2. As can be seen from (a), (c) and (e) in FIG. 3, BMO and BMO-2 had 3D microspheric structures. As can be seen from (c) and (e) in FIG. 3, BMO-2 included the BMO with a 3D microspheric structure, the $(BiO)_2CO_3$ and the $Bi_2O_3$ ultra-thin nanosheets. As can be seen from (d) and (f) in FIG. 3, the interplanar spacings of 0.315 nm, 0.27 nm and 0.32 nm corresponded to the interplanar spacing (131) of the BMO which belonged to an orthorhombic system, the interplanar spacing (110) of the $(BiO)_2CO_3$, and the interplanar spacing (120) of the $Bi_2O_3$ (the parts marked by the curves) respectively. The results showed that the $Bi_2O_3/(BiO)_2CO_3/Bi_2MoO_6$ composite photocatalyst was successfully prepared.

Figure 4:
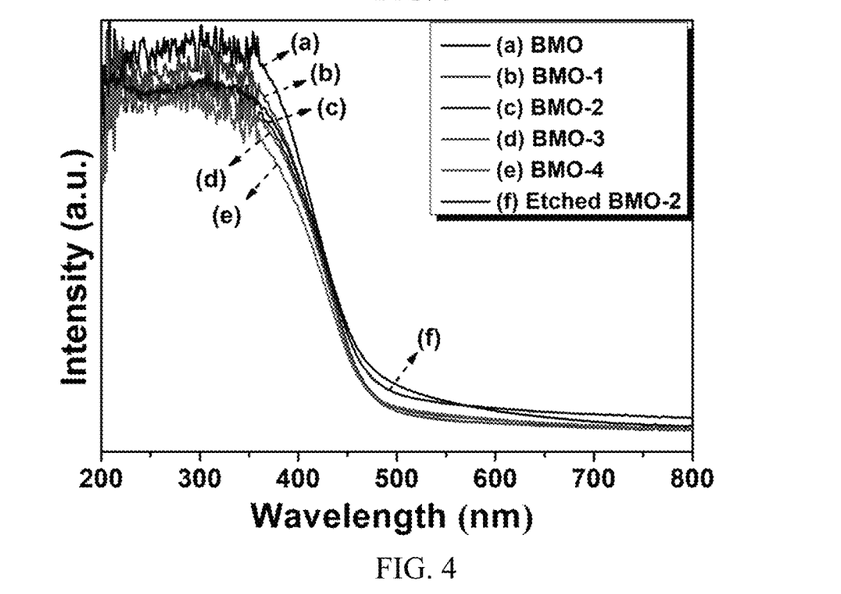
FIG. 4 shows UV-vis diffuse reflectance spectra (UV-vis-DRS) of a $Bi_2MoO_6$ photocatalyst and the $Bi_2O_3/(BiO)_2CO_3/Bi_2MoO_6$ composite photocatalyst obtained by the preparation method of the present invention.

FIG. 4 showed the UV-Vis-DRS absorption spectra of BMO and BMO-2 solids. It can be seen from FIG. 4 that the BMO had an absorption edge of about 490 nm, while the BMO-2 photocatalyst had an absorption edge similar to that of the BMO with a slightly wider band gap.

The $Bi_2O_3/(BiO)_2CO_3/Bi_2MoO_6$ composite photocatalyst prepared by the present invention can be used to photocatalyzing degradation of phenol. Phenol, also known as carbolic acid, was a common chemical. It was an important raw material for production of certain resins, bactericides, preservatives and drugs (such as aspirin), and a major intermediate product in oxidization of high molecular aromatic hydrocarbons. Phenol-containing wastewater had a wide range of sources, and mainly came from coal chemical, petrochemical, farm chemical, phenolic resin, coking enterprises and the like. The phenol concentration in wastewater from chemical and oil refining industries and the like was greater than 1000 mg/L. The phenol in such wastewater can be hardly removed by conventional water treatment methods and thus posed a serious threat to human health and ecological balance. Phenolic substances can enter the body through skin, mouth, respiratory tract and mucous membranes to inhibit the central nervous system and damage a liver or a kidney. Inhalation of high concentration of steam thereof can cause, for example, dizziness, headache, fatigue, blurred vision and pulmonary edema. Excessive intake of phenol can result in poisoning and even death, which seriously threatened human health and living environment. Phenol-containing wastewater posed a serious threat not only to human health, but also to animals and plants. When the content of phenol in water reached a certain level, fish would show symptoms of poisoning. If it exceeded the limit, fish would die in a large number or even disappear. The toxicity of phenol-containing wastewater can also inhibit natural growth rate of other organisms in a water body and destroy ecological balance. Therefore, surface water in China had a maximum allowable concentration of volatile phenols of 0.1 mg/L (water grade V). China's Standards for drinking water quality set that volatile phenols should not exceed 0.002 $mg \cdot L^{-1}$. Therefore, for health of humans, animals and plants and for protection of the environment, it was of great significance to effectively remove phenols in wastewater.

Experiment was carried out as follows: phenol was dissolved in water to prepare a degradation solution with a concentration of 10 $mg \cdot L^{-1}$. A catalyst powder (concentration of 1000 $mg \cdot L^{-1}$) was added, stirred in dark for 30 min to reach an adsorption equilibrium. The photodegradation solution was placed in a photocatalysis reactor for light irradiation with an experimental light source of metal halide lamp which simulated visible light (emission spectrum of 380-800 nm, with light below 420 nm filtered out by a filter). A sample was taken every 30 min and centrifuged to take a supernatant. Spectrophotometry with 4-aminoantipyrine was used to measure absorbance of phenol at the maximum absorption wavelength of 507 nm and photometry was used to determine a change in concentration and thus to evaluate photocatalytic activity of the catalyst.

Figure 5:
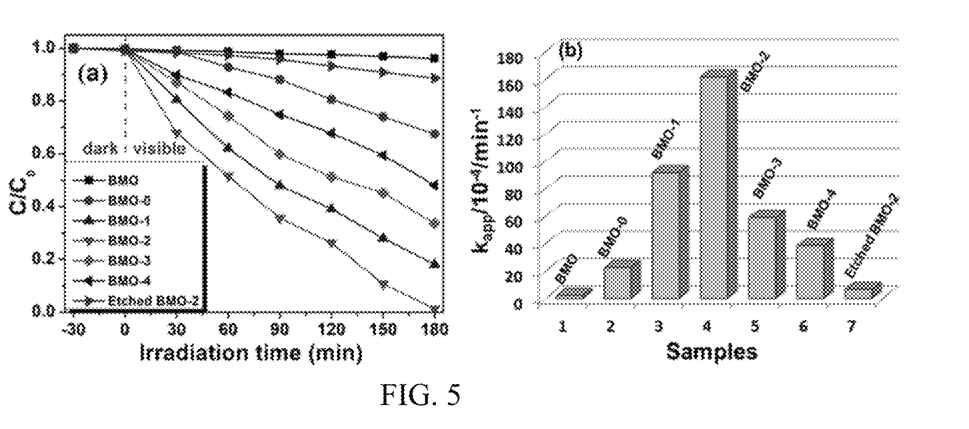
FIG. 5 shows comparison in catalytic activity under visible light of a $Bi_2MoO_6$ photocatalyst vs. the $Bi_2O_3/(BiO)_2CO_3/Bi_2MoO_6$ composite photocatalyst obtained by the preparation method of the present invention.

In FIG. 5, (a) showed changes of phenol concentration during degradation, and (b) showed apparent rate constants of phenol degradation. It can be seen from (a) in FIG. 5 that BMO-2 had the highest photocatalytic activity and BMO had the lowest photocatalytic activity, with a phenol degradation rate of 98.8% or 3.71% respectively after light irradiation for 180 min.

Figure 6:
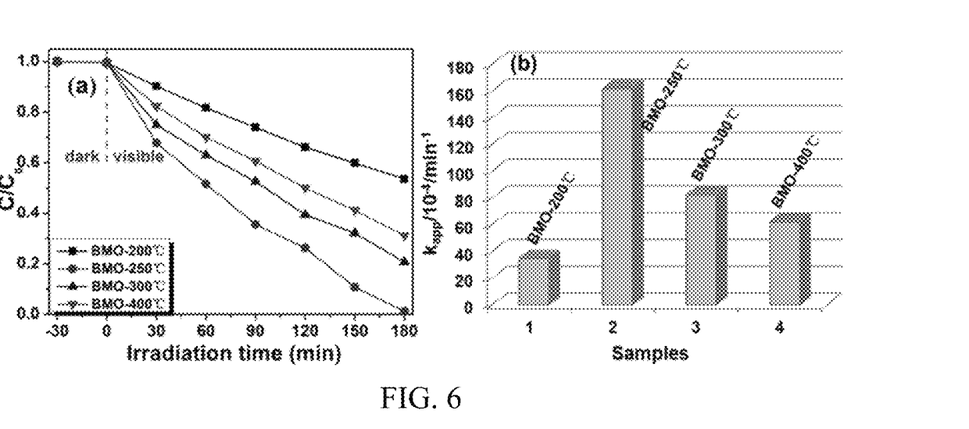
FIG. 6 shows comparison in catalytic activity under visible light of a $Bi_2MoO_6$ photocatalyst vs. the $Bi_2O_3/(BiO)_2CO_3/Bi_2MoO_6$ composite photocatalyst obtained by the preparation method of the present invention at different roasting temperatures.

In FIG. 6, (a) showed changes of phenol concentration during degradation with the $Bi_2O_3/(BiO)_2CO_3/Bi_2MoO_6$ composite photocatalyst obtained at different roasting temperatures, and (b) showed apparent rate constants of phenol degradation. As can be seen from (a) in FIG. 6, the $Bi_2O_3/(BiO)_2CO_3/Bi_2MoO_6$ composite photocatalyst obtained by roasting at 250° C. had the highest photocatalytic activity.

Figure 7:
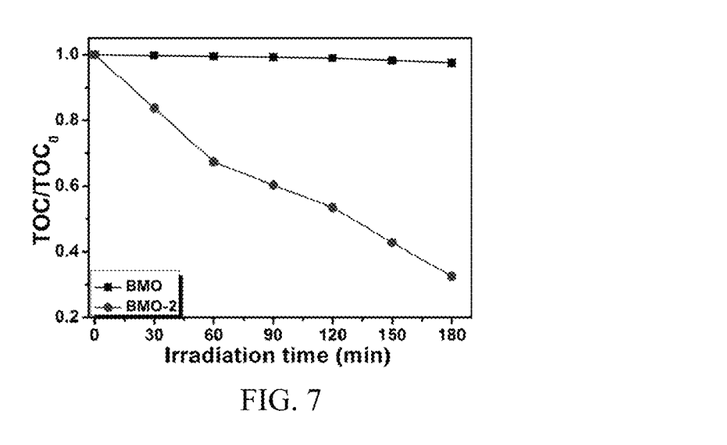
FIG. 7 shows comparison in concentration of total organic carbon (TOC) after phenol removal with a $Bi_2MoO_6$ photocatalyst vs. the $Bi_2O_3/(BiO)_2CO_3/Bi_2MoO_6$ composite photocatalyst obtained by the preparation method of the present invention.

FIG. 7 showed changes of TOC concentration during phenol removal with BMO or BMO-2. It can be seen from FIG. 7 that BMO-2 had the highest TOC photocatalytic efficiency for phenol removal, while BMO had the lowest photocatalytic efficiency. BMO-2 and BMO had a TOC degradation rate of 67.50% and 2.53% respectively after light irradiation for 180 min. Results showed that the major products of photocatalytic degradation of phenol were $CO_2$ and $H_2O$.

Figure 8:
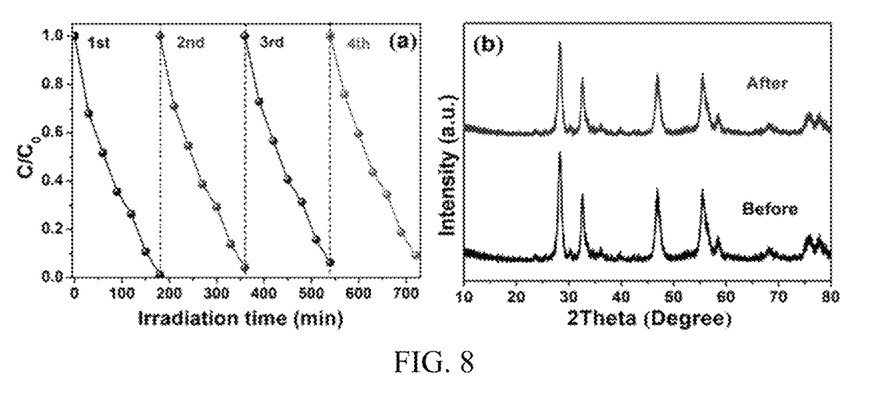
FIG. 8 shows comparison in catalytic activity under visible light and XRPD patterns of the $Bi_2O_3/(BiO)_2CO_3/Bi_2MoO_6$ composite photocatalyst obtained by the preparation method of the present invention before or after use for 4 times.

In FIG. 8, (a) showed comparison in catalytic activity under visible light of BMO-2 during use for 4 times, and (b) showed the XRPD patterns of BMO-2 before and after use for 4 times. It can be seen from FIG. 8 that after repeated use for 4 times, the activity of BMO-2 decreased slightly, indicating that the catalyst had stable performance and desired reusability.

What is claimed is:

1. A bismuth oxide ($Bi_2O_3$)/bismuth subcarbonate (($BiO)_2CO_3$)/bismuth molybdate ($Bi_2MoO_6$) composite photocatalyst, comprising $Bi_2MoO_6$, wherein $Bi_2O_3$ and $(BiO)_2CO_3$ nanosheets are introduced to a surface of the $Bi_2MoO_6$ through addition of $Na_2CO_3$ and roasting.

2. A preparation method of a $Bi_2O_3/(BiO)_2CO_3/Bi_2MoO_6$ composite photocatalyst, wherein the method is specifically implemented by the following steps:
Step 1: preparing a $Bi_2MoO_6$ photocatalyst;
Step 2: introducing $Bi_2O_3$ and $(BiO)_2CO_3$ nanosheets to a surface of the $Bi_2MoO_6$ photocatalyst obtained in step 1 through addition of $Na_2CO_3$ and roasting to obtain the $Bi_2O_3/(BiO)_2CO_3/Bi_2MoO_6$ composite photocatalyst.

3. The preparation method of a $Bi_2O_3/(BiO)_2CO_3/Bi_2MoO_6$ composite photocatalyst according to claim 2, wherein the step 1 comprises:

Step 1.1: taking $Bi(NO_3)_3 \cdot 5H_2O$ and $Na_2MoO_4 \cdot 2H_2O$ in a molar ratio of 2:1, dissolving the $Bi(NO_3)_3 \cdot 5H_2O$ in an ethylene glycol solution, then adding the $Na_2MoO_4 \cdot 2H_2O$ to the ethylene glycol solution, and finally stirring until a clear solution is obtained;

Step 1.2: adding anhydrous ethanol to the clear solution obtained in step 1.1, stirring, transferring to a reaction kettle for sealing, placing the reaction kettle into an electric heating thermostatic blast drying oven for reaction to obtain a mixed solution A, naturally cooling the mixed solution A to room temperature after the reaction is completed, and then separating by centrifuging, washing and vacuum drying to obtain the $Bi_2MoO_6$ photocatalyst.

4. The preparation method of a $Bi_2O_3/(BiO)_2CO_3/Bi_2MoO_6$ composite photocatalyst according to claim 3, wherein in the step 1.2, the reaction in the electric heating thermostatic blast drying oven is carried out at 160° C. for 12 h.

5. The preparation method of a $Bi_2O_3/(BiO)_2CO_3/Bi_2MoO_6$ composite photocatalyst according to claim 4, wherein in the step 1.2, the vacuum drying is carried out at 60° C. for 5 h.

6. The preparation method of a $Bi_2O_3/(BiO)_2CO_3/Bi_2MoO_6$ composite photocatalyst according to claim 5, wherein in the step 1.2, the reaction kettle is a stainless steel reaction kettle lined with Teflon.

7. The preparation method of a $Bi_2O_3/(BiO)_2CO_3/Bi_2MoO_6$ composite photocatalyst according to claim 4, wherein in the step 2.3, the roasting is carried out at 200-400° C. for 1-3 h.

8. The preparation method of a $Bi_2O_3/(BiO)_2CO_3/Bi_2MoO_6$ composite photocatalyst according to claim 3, wherein the step 2 comprises:
Step 2.1: turning the $Bi_2MoO_6$ photocatalyst obtained in step 1 into a powder, then dispersing in deionized water and subjecting to ultrasonic treatment to obtain a mixed solution B;
Step 2.2: adding a $Na_2CO_3$ solution dropwise to the mixed solution B obtained in step 2.1 to obtain a mixed solution C, wherein a molar ratio of the $Na_2CO_3$ to the $Bi_2MoO_6$ photocatalyst is not greater than 0.3:1;
Step 2.3: performing thermostatic vacuum drying of the mixed solution C obtained in step 2.2 until water is evaporated to dry, roasting the mixed solution C after completion of the thermostatic vacuum drying, washing with distilled water to remove residual $Na_2CO_3$ solution, and vacuum drying at 60° C. for 5 h to obtain the $Bi_2O_3/(BiO)_2CO_3/Bi_2MoO_6$ composite photocatalyst.

9. The preparation method of a $Bi_2O_3/(BiO)_2CO_3/Bi_2MoO_6$ composite photocatalyst according to claim 8, wherein in the step 2.3, the thermostatic vacuum drying is carried at 50-70° C. for 6-8 h.

* * * * *